United States Patent [19]

DiPaolo et al.

[11] Patent Number: 5,402,106

[45] Date of Patent: Mar. 28, 1995

[54] SHOPPING CART THEFT PREVENTION SYSTEM

[75] Inventors: Anthony M. DiPaolo; John T. Hood, both of 18221 Edison Ave., Chesterfield, Mo. 63005; William J. Lavender, Murphy, N.C.

[73] Assignees: Anthony M. DiPaolo, Creve Coeur; John T. Hood, Webster Groves, both of Mo.

[21] Appl. No.: 58,457

[22] Filed: May 6, 1993

[51] Int. Cl.⁶ ............................................. G08B 13/22
[52] U.S. Cl. .................................... 340/572; 340/426; 340/531; 340/547; 340/691; 348/143
[58] Field of Search .............. 340/572, 568, 426, 547, 340/531, 691; 348/143, 152, 154, 153

[56] References Cited

U.S. PATENT DOCUMENTS

| 3,051,936 | 8/1962 | Finger et al. | 340/568 |
|---|---|---|---|
| 3,115,622 | 12/1963 | Jaffe | 340/539 |
| 3,157,871 | 11/1964 | Umanoff | 340/539 |
| 3,172,976 | 3/1965 | Abel | 335/206 |
| 3,249,715 | 5/1966 | Warman | 335/153 |
| 3,346,866 | 10/1967 | Bechtel | 346/1.1 |
| 3,564,468 | 2/1971 | Sablayrolles et al. | 335/207 |
| 3,634,846 | 1/1972 | Fogiel | 340/521 |
| 3,812,484 | 5/1974 | Miller et al. | 340/551 |
| 4,054,752 | 10/1977 | Dennis, Jr. et al. | 348/143 |
| 4,063,230 | 12/1977 | Purinton et al. | 340/568 |
| 4,135,184 | 1/1979 | Pruzick | 340/572 |
| 4,170,005 | 10/1979 | Duke | 340/547 |
| 4,242,668 | 12/1980 | Herzog | 340/539 |
| 4,268,823 | 5/1981 | Rauchut et al. | 340/570 |
| 4,293,778 | 10/1981 | Williams | 307/147 |
| 4,491,967 | 1/1985 | Kobayashi et al. | 455/41 |
| 4,536,754 | 8/1985 | Holce et al. | 340/568 |
| 4,555,696 | 11/1985 | Brown | 335/206 |
| 4,772,880 | 9/1988 | Goldstein et al. | 340/571 |
| 4,868,544 | 9/1989 | Havens | 340/572 |
| 5,155,474 | 10/1992 | Park et al. | 340/691 |
| 5,194,844 | 3/1993 | Zelda | 340/426 |

*Primary Examiner*—Glen Swann
*Attorney, Agent, or Firm*—Senniger, Powers, Leavitt & Roedel

[57] ABSTRACT

A shopping cart security system assists in preventing the theft of a shopping cart from a parking lot of an establishment where the carts are used. The parking lot has at least one entrance and exit driveway. The system includes a magnet mounted on the shopping cart and an actuator buried below the surface of the driveway for generating a signal in response to passage of the cart with the magnet over the driveway. The actuator extends generally transversely with respect to and substantially completely across the driveway. An alarm issues a warning in response to the signal generated by the actuator. Also, a system for monitoring unauthorized entry into a restricted area having a door, a magnet carried by the door and an actuator controlled by the magnet for signalling opening of the door.

19 Claims, 6 Drawing Sheets

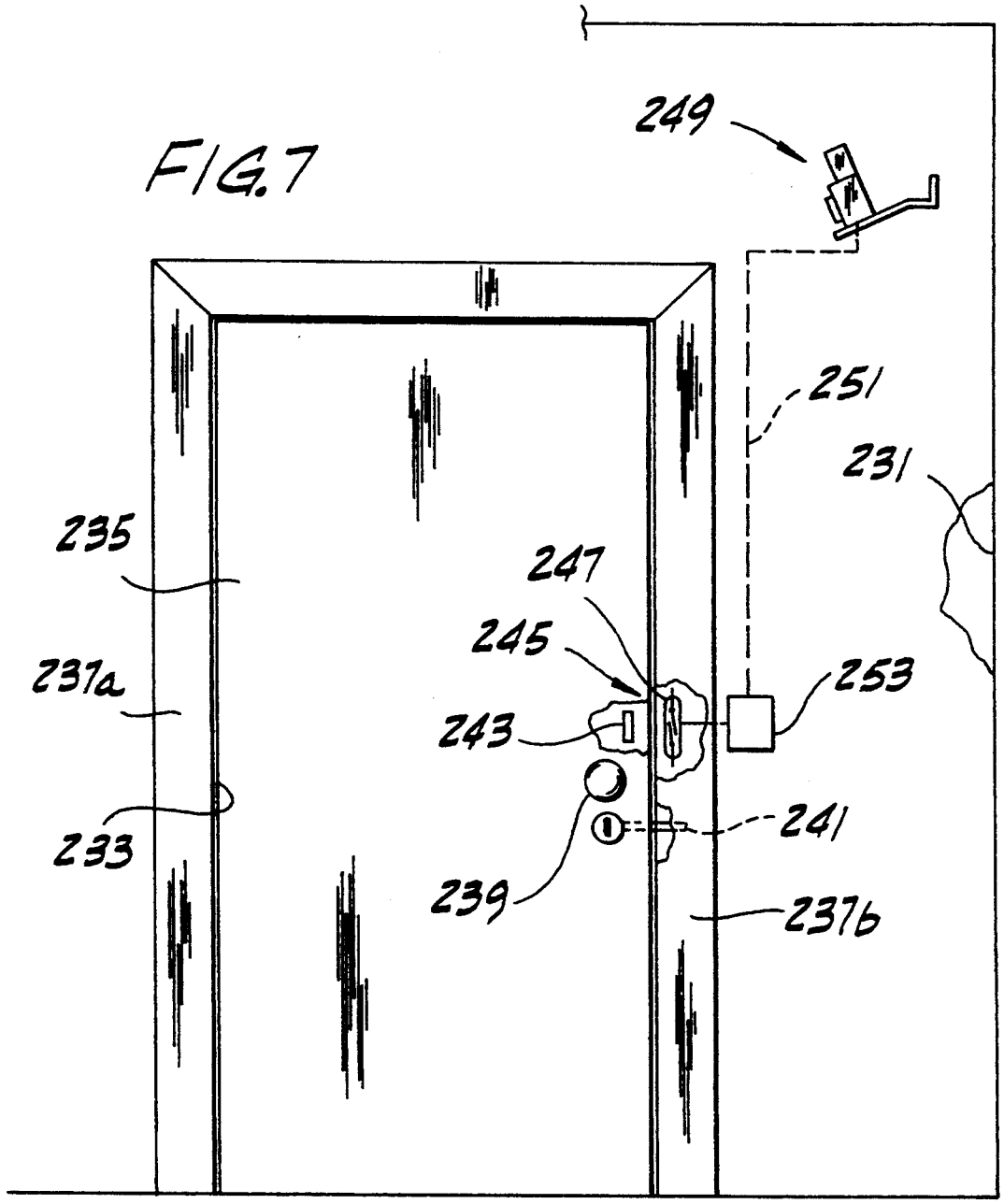

SHOPPING CART THEFT PREVENTION SYSTEM

BRIEF SUMMARY OF THE INVENTION

This invention relates generally to security systems and more particularly to a shopping cart security system for preventing theft of a shopping cart from a parking lot of an establishment where the carts are used.

Shopping cart thefts contribute significantly to the overhead costs associated with operating retail or grocery stores. A typical stainless steel shopping cart, which is required in most applications because of its durability, may cost up to $50.00 or more. Although there are presently available shopping cart security systems for preventing the theft of a shopping cart from a parking lot, these systems require significant modifications made to the shopping cart, which are costly and time-consuming. For example, the shopping cart Theft prevention systems shown in U.S. Pat. Nos. 4,242,668, 4,772,880 and 5,194,844 each have a disabling device mounted on the shopping cart (e.g., for disabling the wheel of the shopping cart) responsive to either a radio signal or a magnetic field around a perimeter of the parking lot for disabling the cart after passing beyond the range of the radio signal or through the magnetic field. The systems shown in each of these patents require significant, time-consuming, modifications made to each cart which are not feasible for an establishment having hundreds, and sometimes, thousands of such carts. Moreover, such systems are typically expensive to maintain since the disabling device is powered by batteries which need to be replaced frequently.

Accordingly, among the several objects of the present invention may be noted the provision of an improved shopping cart security system which requires minimal modifications made to the shopping carts in order to implement the system; the provision of such a shopping cart security system which does not require a secondary power source (e.g., batteries) for each cart, but operates on a single low voltage power source; the provision of such a shopping cart security system capable of taking a photograph of a person attempting to remove the shopping cart from a parking lot; and the provision of such a shopping cart security system which is easy to install, cost-efficient to manufacture and simple to operate.

In general, a shopping cart security system of the present invention is adapted for preventing theft of a shopping cart from a parking lot of an establishment where the carts are used. The parking lot has at least one entrance and exit driveway. The system comprises triggering means mounted on the shopping cart and sensor means substantially buried below the surface of the driveway for generating a signal in response to passage of the cart with the triggering means over the driveway. The sensor means extends generally transversely with respect to and substantially completely across the driveway. Means issues a warning in response to the signal generated by the sensor means.

Another aspect of the present invention is that of a system for monitoring the unauthorized entry into a restricted area including a confined space accessible only through at least one access passageway having a door or the like for selectively blocking the entrance into or exit from the confined area via the passageway. The door is adapted for moving between open and closed positions. The system comprises triggering means mounted on one of the door and the confined space proximate the door. The triggering means comprises a magnet. Sensor means is mounted on the other of the door and the confined space proximate the door. The sensor means is generally adjacent the magnet of the triggering means when the door is closed. The sensor means is magnetically responsive upon the movement of the magnet, normally positioned adjacent the sensor means, away from the sensor means. The sensor means generates a signal upon movement of the door away from its closed position. Means responsive to the signal from the sensor means visually monitors the unauthorized entry into the confined space whereby the monitoring means is activated upon receiving the signal from the sensor means.

A third aspect of the present invention is that of an elongate sensor comprising a protective outer shell member and a series of magnetically responsive reed switches mechanically connected end to end within the outer shell member and electrically connected in parallel. The sensor is connected to a power source whereby upon passage of a magnet proximate to the sensor at any point along the length of the sensor, one of the reed switches of the sensor is responsive to the passage of the magnet proximate to the reed switch for generating a signal.

Other objects and features will be in part apparent and in part pointed out hereinafter.

BRIEF DESCRIPTION OF THE DRAWINGS

FIG. 6 is a partial schematic and partial block diagram of the system; and FIG. 7 is a schematic front elevational view of a security system of another preferred embodiment.

Corresponding reference characters indicate corresponding parts throughout the several views of the drawings.

DETAILED DESCRIPTION OF THE PREFERRED EMBODIMENTS

Figure 1:
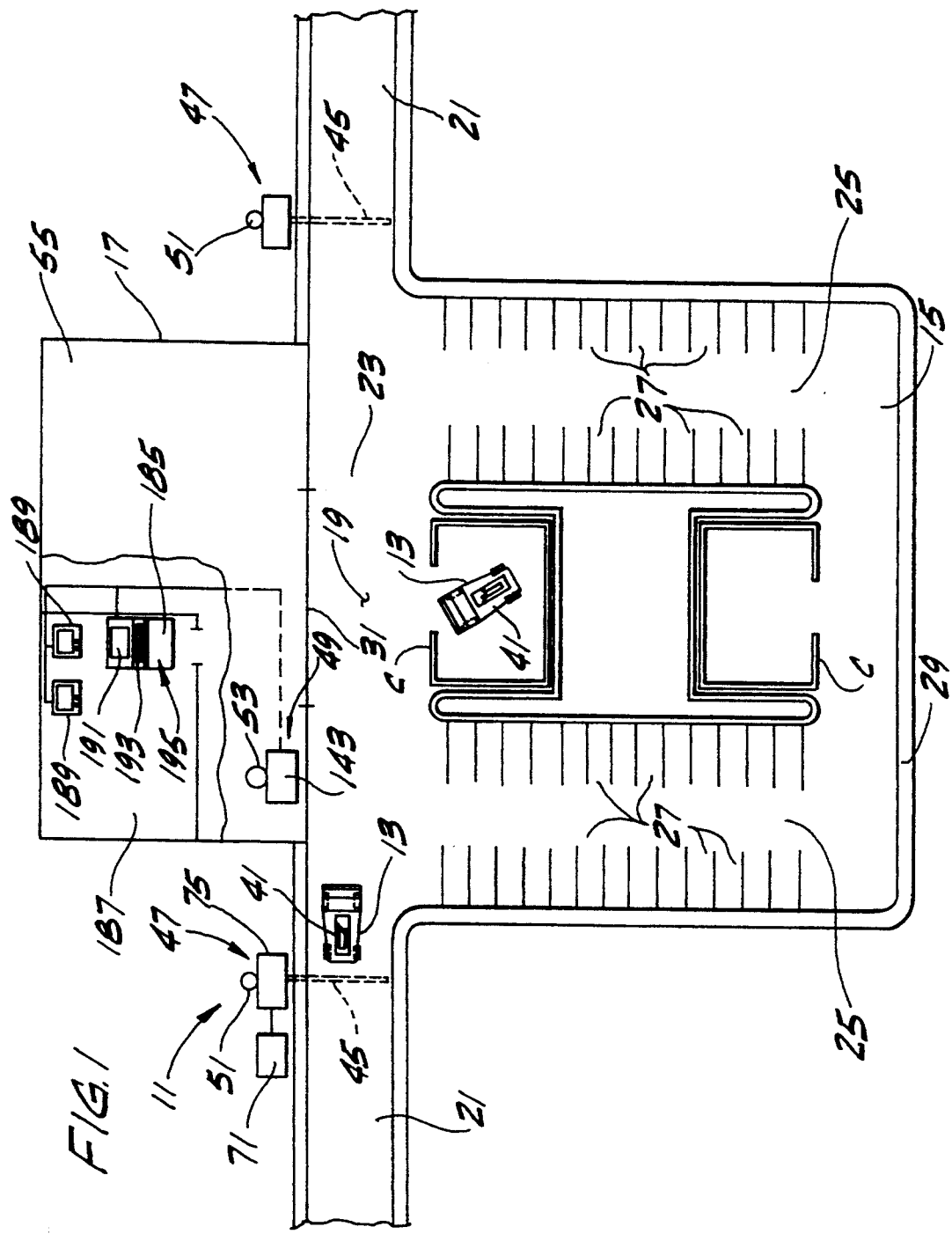
FIG. 1 is a schematic environmental top plan view showing a shopping cart security system of the present invention.
Figure 2:
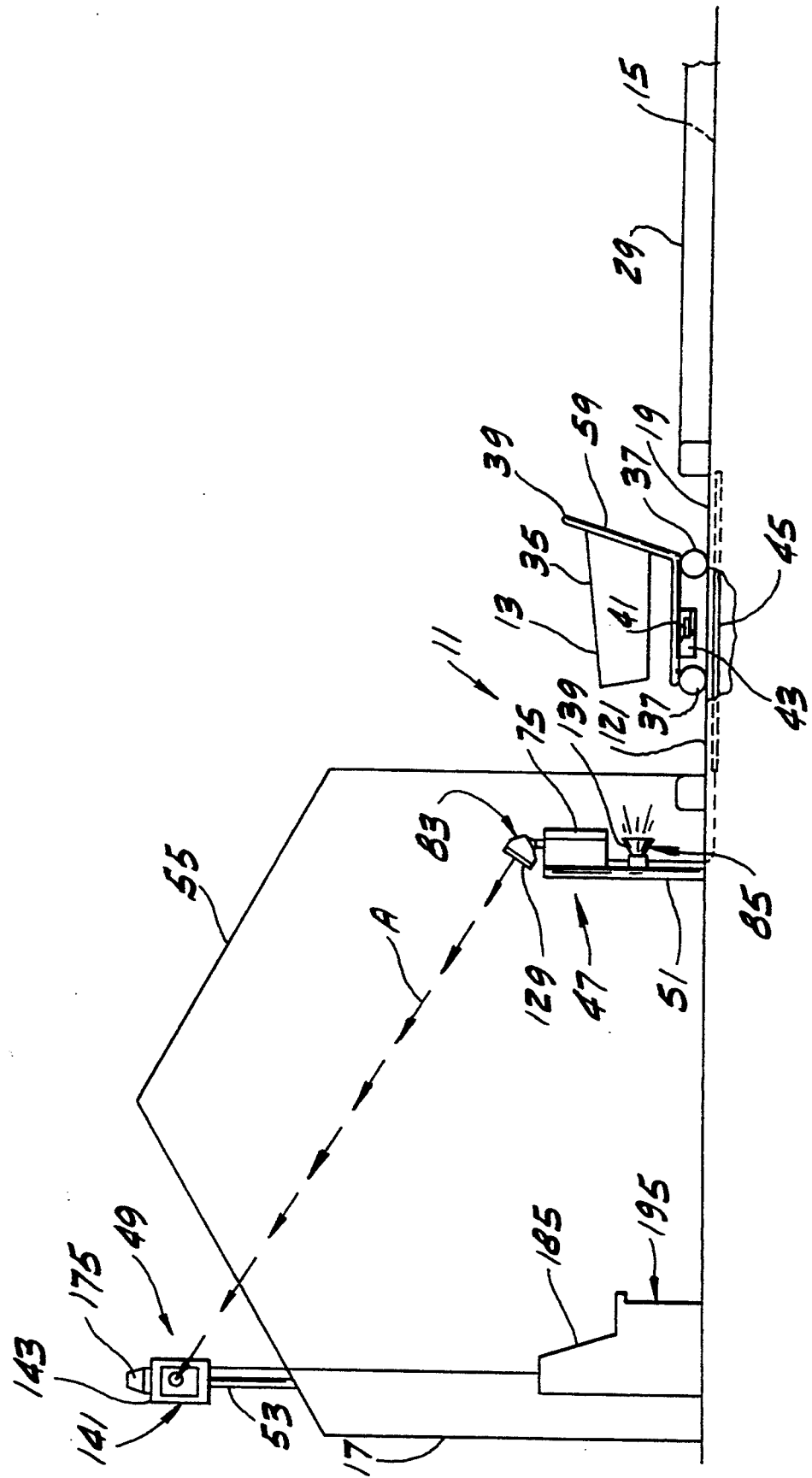
FIG. 2 is a schematic elevational view of the security system substantially shown in FIG. 1.

Referring now to the drawings, and more particularly to FIGS. 1 and 2, a parking lot security system of this invention, generally indicated at 11, for preventing theft of shopping carts 13 from a parking lot 15 of an establishment where the carts are used, such as a retail or grocery store 17, is shown. The parking lot 15 is of standard construction, having an asphalt or concrete surface 19 and two entrance and exit driveways 21 for entering and exiting the parking lot 15. These driveways 21 lead to a main driveway 23 extending across the front of the store 17. A series of branch passageways 25 extend transversely away from the main driveway 23 for accessing parking spaces 27 located on either side of each branch passageway 25. The parking lot 15 is closed from traffic (other than the entrance and exit driveways) by an island 29 forming a raised portion relative to surface 19 preferably having plants and trees or the like. The island 29 channels traffic from the branch passageways 25 to the main driveway 23 and out to the entrance and exit driveways 21. Thus, the only practical way a shopping cart 13 can be removed from the parking lot 15 is through the entrance and exit driveways 21. It is to be understood that the parking lot 15 shown in FIGS. 1 and 2 is exemplary and that the security system 11 of the present invention may be used with parking lots having other configurations.

Shopping carts 13 are gathered and contained in corrals, such as corrals C, provided at various locations in the parking lot 15 and a main corral (not shown) typically inside the store 17 near the main lobby at the entrance 31 of the store. The shopping carts 13 are of standard construction, each having a frame 33 and a basket 35 supported by the frame. Four wheels, each designated 37, are mounted on the bottom of the frame 33; the rear pair of wheels being fixedly mounted and the front pair of wheels being pivotally mounted on the frame 33 for steering the shopping cart 13. A handle 39 is provided for pushing the shopping cart 13.

Security system 11 comprises a magnet 41 (broadly "triggering means") mounted on the bottom of the frame 33 of the cart 13 as illustrated in FIGS. 1 and 2. Each magnet 41 is approximately 6 inches long and is housed in a hard plastic protective shell 43 which is mounted on the bottom of the frame 33 of the shopping cart 13 via screw fasteners (not shown) which are incapable of being unscrewed. The arrangement of mounting the enclosed magnet on the bottom of the frame 33 of the cart 13 is of sufficient strength so that it cannot be tampered with and is such that the magnet 41 is substantially concealed at the bottom of the cart 13. A magnetically responsive actuator 45 (broadly "sensor means") is buried below the surface 19 of the parking lot 15 at each of the entrance and exit driveways 21. Each actuator 45 extends transversely with respect to and completely across its respective entrance and exit driveway 21 and generally parallel to the surface 19 of the driveway. The actuators 45 are preferably buried approximately 2 inches below the surface 19 of respective entrance and exit driveways 21. Each actuator 45 is responsive to the passing of a cart 13 having a magnet 41 over the actuator 45, at any point along the length of the actuator, to generate a signal.

A transmitter assembly generally indicated at 47 is located above the surface 19 of the entrance and exit driveway 21 at each driveway for, among other functions, transmitting the signal generated by its respective actuator 45 to a receiver assembly generally indicated 49 located proximate to the store 17. More particularly, each transmitter assembly 47 is mounted on a post 51 approximately 8 to 10 feet in height and is capable of producing a beam of light which is received by the receiver assembly 49 which in turn, issues a warning to security personnel in the store, for example, in response to receiving the transmitted signal. As shown, the receiver assembly 49 is mounted on a post 53 located on the roof 55 of the store 17. However, it is to be understood that the transmitter and receiver assemblies 47 and 49 may embody different arrangements and still fall within the scope of the present invention.

Figure 3:
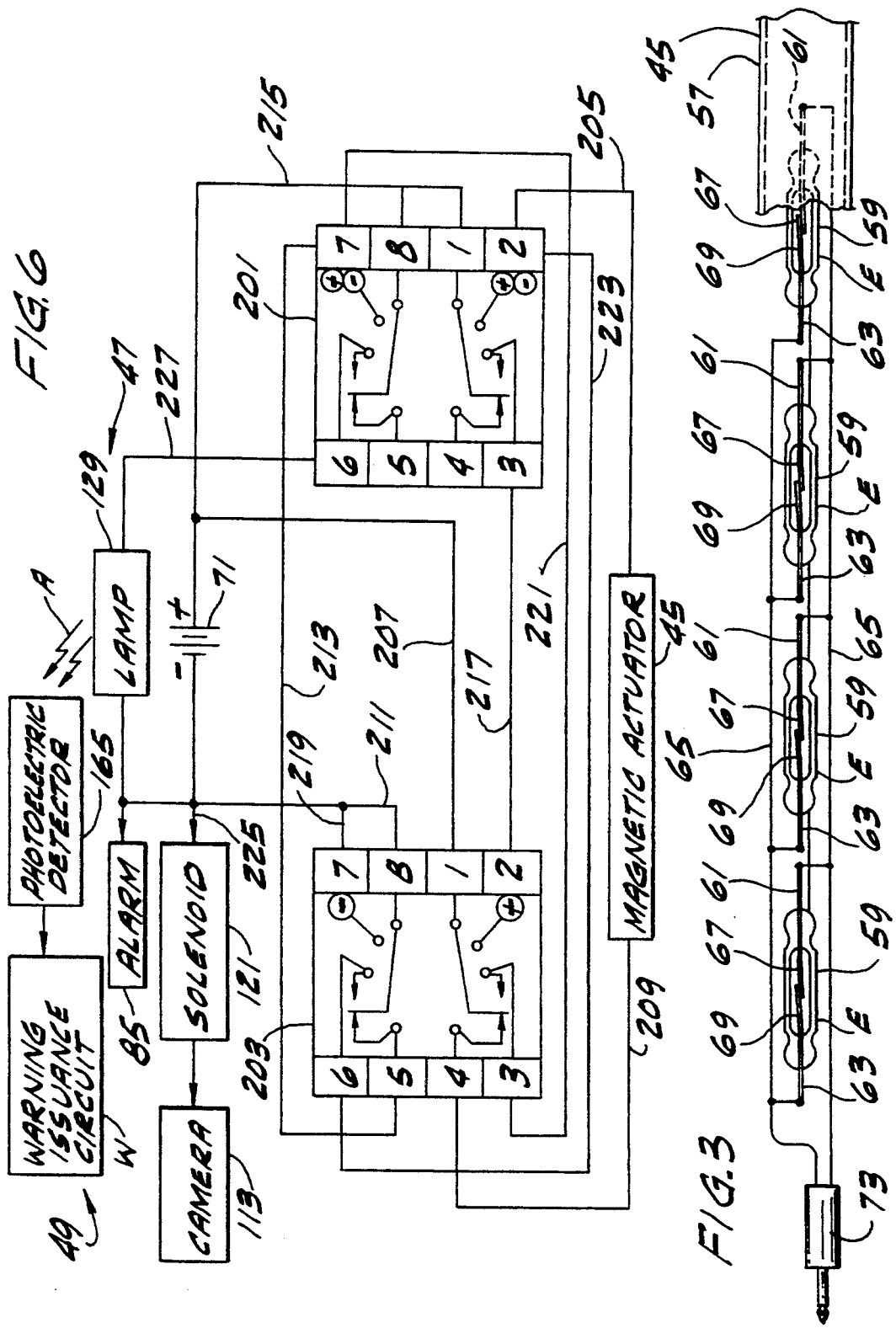
FIG. 3 is a schematic top plan view of a portion of an actuator of the security system having a series of reed switches.

Turning now to FIG. 3, there is shown a schematic of a portion of one of the actuators 45 having a protective outer shell member 57 made from polyvinylchloride (PVC) material, for example. The shell member 57 must be of suitable strength to withstand the passing of an automobile or a cart over the actuator 45 without harming its contents. A series of elongate reed switches, each designated 59, are arranged in end to end relation within the shell member 57 such that adjacent reed switches 59 are electrically connected in parallel. The reed switches 59 are mechanically connected by soldering the ends 61 and 63 of the reed switches together. As illustrated in FIG. 3, the reed switches 59 are electrically connected in parallel by wires 65 soldered to the reed switches 59. Generally, each reed switch 59 includes two overlapping, flat, cantilevered ferromagnetic reeds 67 and 69 that are surrounded by a dry, inert gas and sealed in a glass envelope E. A relatively small air gap separates the free overlapping ends of the reeds 67 and 69, and passing of a magnet (e.g., magnet 41) over the reeds 67 and 69 causes the reeds to attract to each other. Typically, each reed switch 59 is 4 or 5 inches in length. For this reason, the magnet 41 is preferably selected to be 6 inches in length to ensure that at least one of the reed switches 59 in the actuator switch is triggered when the magnet 41 passes over it. The reed switches 59 may be DRR model reed switches which may be purchased from Hamlin Corporation of Lake Mills, Wis.

However, it is to be understood that other actuation devices may be used as well. For example, a pressure-responsive actuator may be buried below the surface 19 at the entrance and exit driveways 21. Thus, upon passage of a shopping cart 13 over the pressure-responsive actuator, a signal is generated. Another example is a photoelectric detector which has a beam spanning a respective entrance and exit driveway 21. Thus, upon passage of a shopping cart 13 through the beam, a signal is generated. These actuation devices are especially suited for night use and "No Trespassing" zones.

A preferred embodiment of the invention includes a 12 V source, such as an automobile battery 71. A low voltage circuit, including the 12 V source, is completed upon the attraction of the reeds 67 and 69 in response to the passing of a magnet 41 thereby generating the signal. On one end of the actuator 45, a phono plug 73 is provided for connecting the actuator 45 to the transmitter assembly 47. The phono plug 73 may also be embodied as a coaxial connector or similar two-conductor connector. Reed switches 59 are preferably provided since each reed switch 59 is independently activated upon passage of a magnet 41 thereover. Co-aligning the flat portions of the reed switches 59 ensures that each switch may be independently activated. Thus, since the reed switches 59 are electrically connected in parallel, a single reed switch 59, upon being triggered by the magnet 41, closes the circuit to generate the signal. Other actuators were considered, such as an actuator comprising a ferromagnetic core and a coil electrically connected to a power source which is responsive to metal objects passing thereover. However, this arrangement is sensitive to automobiles and carts, for example, and would unwantingly be activated upon passage of the automobiles and carts over the actuator. The system of the present invention is responsive only to carts 13 having a magnet 41 and therefore is preferred over other available systems.

Figure 4:
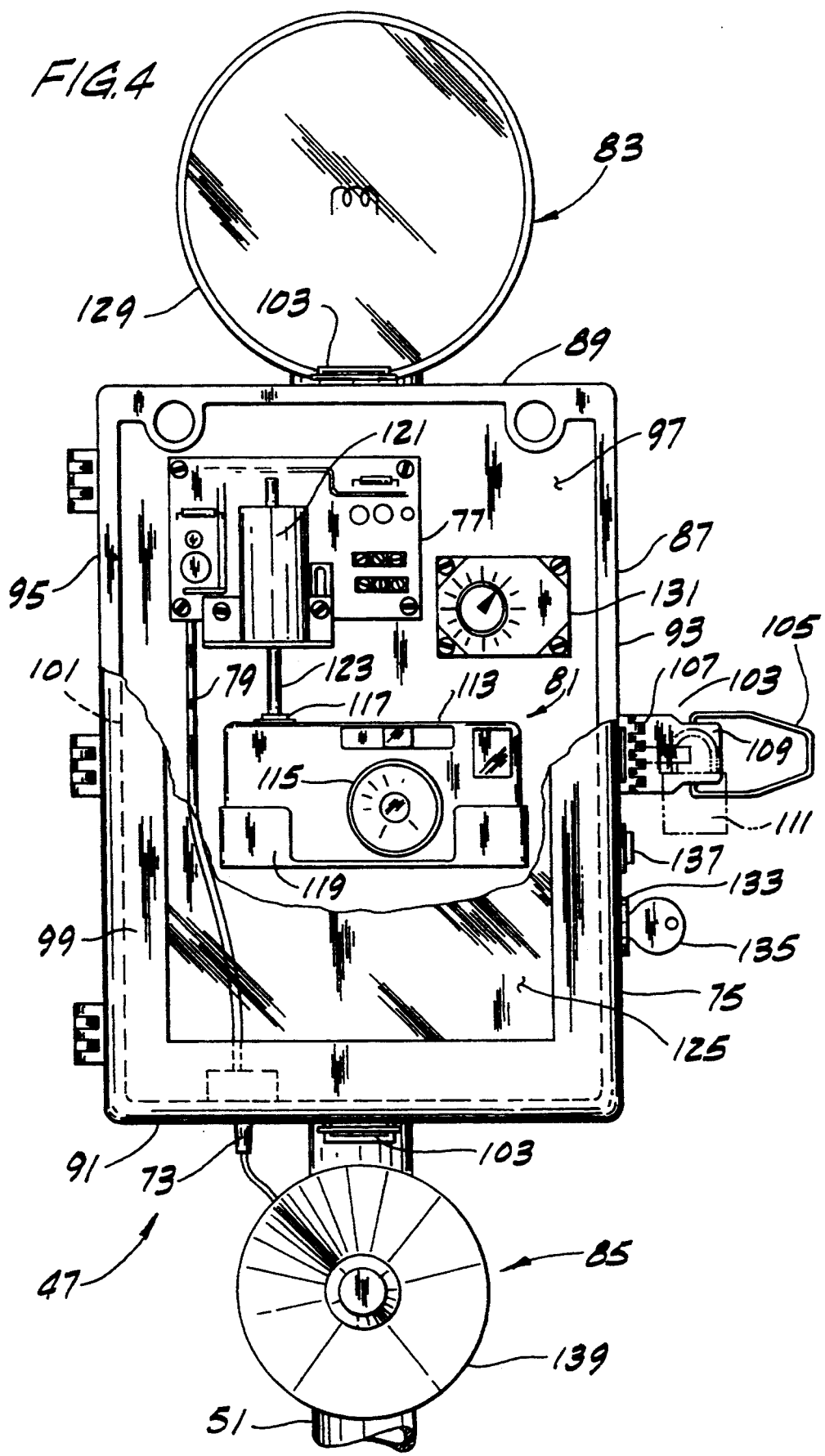
FIG. 4 is a front elevational view of a transmitter assembly of the security system.

Turning now to FIG. 4, one of the transmitter assemblies 47 is mounted on post 51 which is located proximate to one of the entrance and exit driveways 21. Since both transmitter assemblies 47 are of identical construction, a description of one will suffice for both. The transmitter assembly 47 includes a box-like transmitter housing 75 having a circuit board 77 which electrically connects and activates some of the various components of the system 11, a phono plug receiver (not shown) electrically connected to the circuit board 77 via wire 79 for receiving the phono plug 73, a monitor generally indicated at 81 for monitoring the movement of a cart 13 after it passes over the actuator 45, a transmitter 83 for transmitting the signal located on top of the housing 75, and an alarm 85 mounted on the post 51. Powering the aforementioned components of the transmitter assembly 47, along with the actuator 45, is the same 12 V power source.

The transmitter housing 75 includes a body 87 having a top wall 89, a bottom wall 91, side walls 93 and 95 and a rear wall 97; the forward edges of the top wall, bottom wall and side walls defining an opening of the body 87. A door 99 hingedly mounts on one of the side walls (i.e., side wall 95) to block the opening of the body 87 of the transmitter housing 75. The door 99 includes a gasket 101 for sealing the interior of the body 87 and protecting the contents housed therein. The circuit board 77 and monitor 81 are mounted within the interior of the body 87 as shown in FIG. 4 and are protected therein from the elements outside. The phono plug receiver has a female adapter extending through the bottom wall 91 of housing 75 for receiving a male adapter of the phono plug 73. A preferred method, however, is to hard wire the actuator 45 to the circuit board 77.

Three latching mechanisms, each designated 103, located at the exterior surfaces of the top wall 89, bottom wall 91 and the other side wall 93, along respective forward edges thereof, securely retain the door in its closed position such that the gasket 101 is compressed between the door 99 and the top 89, bottom 91 and side walls 93 and 95 for sealing the interior of the transmitter housing 75. Each latching mechanism 103 includes a bail 105 engageable with a catch 107 mounted on the outer edge of the door 99. The bail 105 is movable by a lever 109 between an extended position in which it is capable of engaging the catch 107 of the door 99 when the door is spaced from the body 87 of the transmitter housing 75 to a locked position in which the bail 105 securely retains the door 99 to the opening of the body 87 of the transmitter housing 75. The latching mechanism 103 located on the side wall 93 includes an eyelet for receiving a lock 111 (shown in phantom) for retaining and locking the lever 109 of the latching mechanism 103 in its locked position. This lock 111 prevents tampering of the contents housed within the housing 75 by unauthorized personnel.

Monitor 81 comprises a camera 113 having a lens 115 and a shutter-release button 117 for activating the camera. A mounting bracket 119 mounts the camera 113 to the rear wall 47 of the body 87 of the transmitter housing 75. The camera 113 is pivotally attached to the mounting bracket 119 for universal movement of the camera 113 relative to the mounting bracket 119. A small drive motor (not shown) capable of moving the camera 113 may be included for aiming the camera at different viewing areas. The camera 113 is oriented in the transmitter housing 75 via the mounting bracket 119 in a position suitable for taking the picture of a person taking the shopping cart 13 out of the parking lot 15. The camera 113 is of standard construction and is preferably suited for outdoor uses. For example, a camera purchased from Canon under the trademark "Snappy" has been found to give satisfactory results. One embodiment of the present invention includes a counter (not shown) for counting the number of exposures taken and for indicating that the film in the camera 113 needs to be replaced. The counter may be set to indicate film replacement for film having any number of exposures (e.g., 12, 24 or 36). The circuitry required for the operation of the camera 113 will be described in greater detail below.

A solenoid 121, electrically connected to the circuit board 77 and responsive to the signal generated by the actuator 45, is also mounted on the rear wall 97 of the transmitter housing 75 above the camera 113. The solenoid 121 is a 12 V D.C. solenoid available from Guardian Electric of Woodstock, Ill. A plunger 123 of the solenoid 121 depresses the shutter-release button 117 of the camera 113 when the solenoid 121 is energized in response to the signal from the actuator 45 after a cart 13 with the magnet 41 passes over the actuator. A window 125 is provided in the door 99 of the transmitter housing 75 so that upon the solenoid plunger 123 depressing the button 117 of the camera 113, a picture may be taken of the person taking the shopping cart 13 out of the parking lot 15 via the entrance and exit driveway 21.

A video camera (not shown) may be substituted for the photographic camera 113, or be provided in addition to the photographic camera, if it is desired to take a video of the person attempting to leave the parking lot 15 with a shopping cart 13. Since the video camera operates upon the same principles as camera 113, it is not shown in the drawings for purposes of simplicity. The video camera is especially suited for monitoring the movement of the cart 13 after it passes over the actuator 45. Like the camera 113, the video camera may also be mounted on the rear wall 89 of the transmitter housing 75 by a bracket (not shown). Also, the video camera is pivotally attached to the mounting bracket for universal movement of the video camera relative to the mounting bracket. A small drive motor may be provided for moving the video camera and aiming it toward different viewing areas. The lens of the video camera is directed through the window 125 in the door 99 of the transmitter housing 75. Upon passing of a shopping cart 13 having a magnet 41 over the actuator 45, the signal generated thereby is received by the circuit board 77 to activate a video camera solenoid (not shown), electrically connected to the circuit board 77 and responsive to the signal generated by the actuator 45, mounted on the rear wall 97 of the transmitter housing 75 proximate to the video camera. This solenoid is of substantially the same construction as solenoid 121. The invention may provide a detector (not shown) for detecting whether the film in the camera needs replacement.

The transmitter indicated at 83 of the transmitter assembly 47 is mounted on the outer surface of the top wall 89 as illustrated in FIG. 4. The transmitter 83 comprises a high power light source, such as a quartz halogen lamp 129, electrically connected to the circuit board 77. The quartz halogen lamp 129 may be the lamps sold under the trademark "Million-Plus Candle Power Spotlight" by Coleman Company, Inc. of Witchita, Kans. Upon movement of a cart 13 with a magnet 41 over the actuator 45, the lamp 129 is energized to generate a beam of light indicated by arrows A in FIG. 2 aimed at the receiver assembly 49. The lamp 129 transmits the presence of the signal generated by the actuator 45 to the receiver assembly 49 at the store 17 without having to hard wire the remotely located transmitter assembly 47 to the receiver assembly 49. Remote activation of the receiver assembly 49 is desirable since in many applications it is impractical to bury underground wiring or to provide above-ground poles for supporting the wiring necessary to electrically connect the assemblies together.

The signal generated by the actuator, upon being received by the circuit board 77 of the transmitter assembly 47, is latched to provide sufficient time for generating the power necessary to operate the transmitter. The length of time that the circuit is latched on is preset. A reset is provided in the circuit board 77 for resetting the latch and terminating the light beam A generated by the transmitter 83 after the preset period of time. A timer 131 is connected to the circuit board 77 for selectively setting the preset period of time. The timer may be of the type sold by Macromatic ® of Charlotte, N.C. under the trademark "Time Ranger".

On side wall 93 of the body 87 of the transmitter housing 75 is a key lock 133 for selectively turning the transmitter on and off. The key lock 133 is of standard construction having a key hole adapted to receive a key 135 and upon rotation of the key, to turn on the transmitter. The key lock 133 is electrically connected to the circuit board 77 and upon turning the key lock 133 with a key 135 to its on position the actuator 45 and transmitter 83 are turned on to detect shopping carts 13. A test button 137 is also provided for testing the transmitter 83 without having to trigger the actuator 45 (i.e., by placing magnet 41 proximate to the actuator 45). By pressing the test button 137, which is located adjacent the key lock 133, the transmitter 83 energizes the lamp 129.

Further provided on the post 51 is the alarm 85 for issuing an audible or visual warning upon triggering the actuator 45. The alarm 85 is electrically connected to the circuit board 77 and is activated upon the triggering of the actuator 45. As shown, the alarm 85 may include a megaphone 139 which is mounted on the post 51 below the transmitter housing 75. The megaphone 139 may be connected to a recorded program for playing a verbal warning. The megaphone 139 may also be adapted to issue a siren type warning. Alternatively, a visual alarm (e.g., a sign) may be provided to visually alert the person that the shopping cart should not be taken from the lot. It is to be understood that the alarm 85 may comprise many different embodiments so long as it captures the attention of the person removing the shopping cart 13 from the parking lot 15. Another sign (not shown) stating that shopping carts 13 cannot be removed from the parking lot 15, or the like, may also be mounted on the post 51. Thus, upon activation of the alarm 85, the person's attention is drawn to the post having the alarm 85 and the sign. The person will most likely read the sign and return the shopping cart 13 to one of the corrals C in the parking lot 15.

Figure 5:
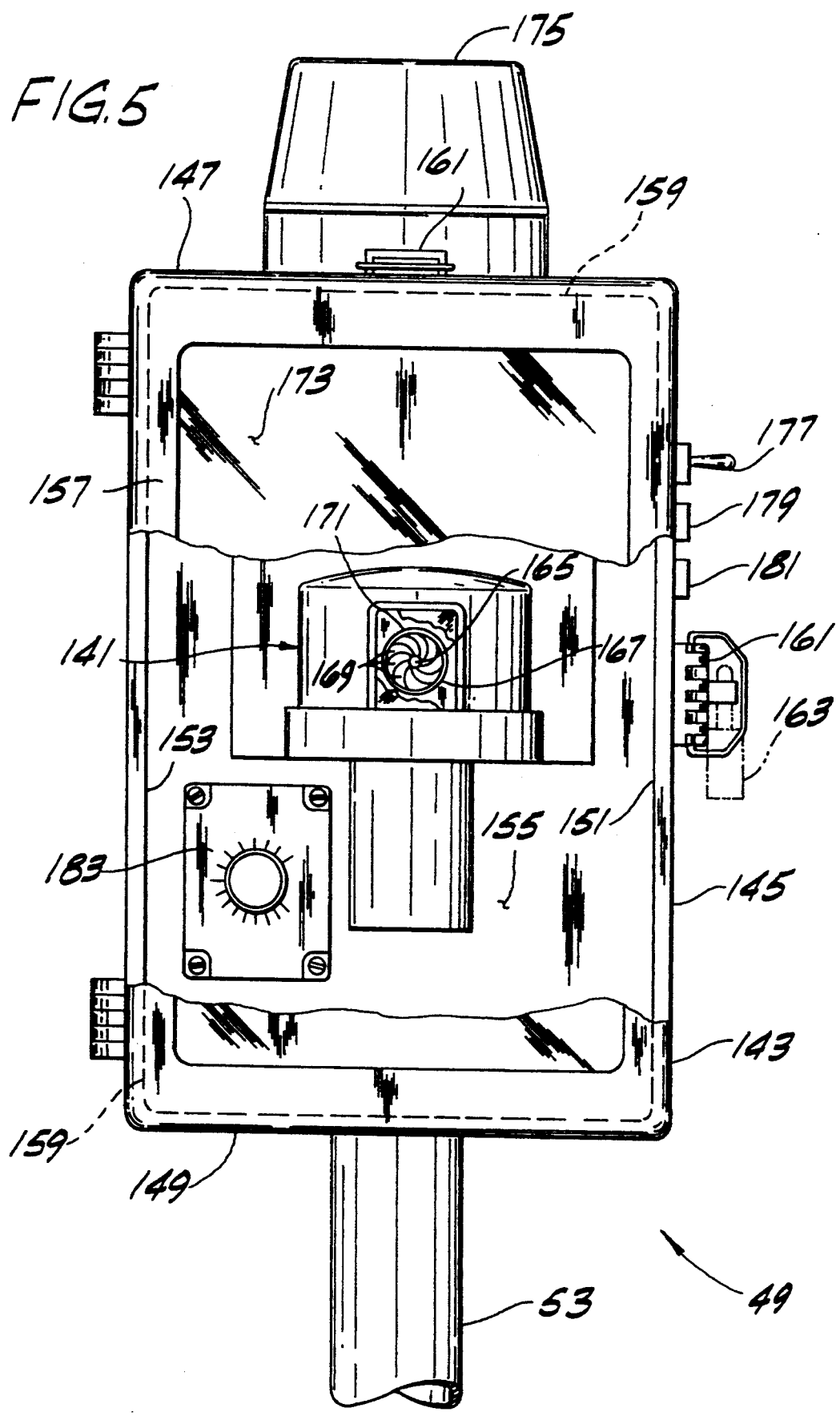
FIG. 5 is a front elevational view of a receiver assembly of the security system.

Turning now to FIG. 5, there is shown a receiver assembly 49 having a light sensitive receiver 141 for receiving the light beam A generated by the transmitter 83. Similar to the transmitter housing 75 of the transmitter assembly 47, the receiver assembly 49 includes a receiver housing 143 having a body 145 comprising a top wall 147, a bottom wall 149, side walls 151 and 153 and a rear wall 155. The forward edges of the top wall 147, bottom wall 149 and side walls 151 and 153 define an opening of the body 145. A front door 157 hingedly mounts on side wall 153 to block the opening of the body 145 of the receiver housing 143. The door 157 includes a gasket 159 for sealing the interior of the body 145 and protecting the contents housed therein. The light sensitive receiver 141 is mounted within the interior of the body 145 as shown in FIG. 5 and is protected therein from the elements outside. Two latching mechanisms, each designated 161, identical to latching mechanism 103 are provided at the exterior surfaces of the bottom wall 149 and side wall 151 for securely retaining the door 157 in its closed position. The latching mechanism 161 located on the side wall 151 also includes an eyelet for receiving a lock 163 (shown in phantom) for retaining and locking the lever of the catching latching mechanism 161 in its locked position.

The light sensitive receiver 141 of the receiver assembly 49 includes a photoelectric detector 165 fixedly mounted on an interior surface of the body 145 of the receiver housing 143 by a bracket (not shown) for sensing the beam of light A transmitted by the halogen lamp 129. Controlling the amount of light received by the detector 165 is an adjustable iris diaphragm 167 having a number of thin opaque plates 169 that can be turned by a ring 171 so as to change the diameter of the opening of the iris diaphragm 167 and thereby control the amount of light received by the detector 115. A window 173 is preformed in the door 157 of the receiver housing 143 for entry of light within the housing and into the detector 167. Preferably, the adjustable iris diaphragm 167 prevents the photoelectric detector 167 from sensing light from sources other than the halogen lamp 129.

As illustrated in FIG. 5, the receiver assembly 49 may also include a visual warning device having a strobe light 175 to signify a transmitted signal (i.e., a beam of light) received by the detector 165. The strobe light 175 is mounted on the exterior surface of the top wall 147 of the receiver housing 143 so that it may be viewed from the parking lot 15 and is similar to those used in the light bars of emergency vehicles. An audible warning, e.g., an alarm (not shown) similar to alarm 85, may also be provided for notifying security personnel, for example. A lever switch 177, or toggle switch, located on side 151 of the receiver housing 143, is provided for turning the receiver 141 on and off. An indicator light, indicated at 179, located next to the lever switch 177, illuminates upon turning the lever switch 177 to its on position. Like the transmitter housing 75, a test button 181 is also provided for testing the receiver 141 without having to transmit a beam of light to the receiver. By pressing the test button 181, which is located adjacent the lever 177, the strobe light 175 of the alarm is activated to signify that the receiver 141 is ready to detect a light beam.

Also mounted in the interior of the receiver housing 143 is another timer 183 for deactivating the strobe light 175 and alarm after a preset period of time. The receiver assembly 49, including the light sensitive receiver 141, strobe light 175 and alarm are powered by a power source (e.g., 12 V source) taken from the store.

Electrically connected to the receiver assembly 9, and illustrated in FIGS. 1 and 2 of the drawings, is a console 185 capable of monitoring and controlling the operation of the system. The console may be located in a security office 187 of the store. The office 187 may also include monitoring picture tubes 189 which, upon activation of the video camera, provides a picture showing the person attempting to remove the shopping cart 13 from the parking lot 15. A recording system (not shown) may also be located in the office 187 for recording the video. As shown, the console 185 includes a screen monitor 191 and a key board 193. The console 185 comprises a microprocessor generally indicated at 195 for controlling and monitoring the operation of the system 11, including the operation of the actuator 45, transmitter assembly 47 and receiver assembly 49. More specifically, the microprocessor 195 is adapted to control and monitor the activities of the actuator 45 (i.e., a signal generated by the actuator), the transmitter 83 (i.e., a beam of light A transmitted thereby), the monitor 81 (i.e., the activation of the camera 113 and whether film replacement is necessary), the audible/visual alarm 85 of the transmitter assembly 47, the receiver 141 (i.e., the receipt of the beam of light A by the receiver), and the audible/visual alarm of the receiver assembly 49, for example.

FIG. 6 is a partial schematic and partial block diagram illustrating the operation of the actuator 45 and transmitter assembly 47, including the transmitter 83, monitor 81 and audio/visual alarm 85. The actuator 45 selectively connects the positive side of the 12 V power supply (e.g., battery 71) to a latching relay 201 via a time delay relay 203. In general, latching relays have contacts which lock in either an energized or deenergized position until reset either manually or electrically. Time delay relays are slow operating relays in which there is an appreciable interval of time between the energizing or deenergizing of the coil and the movement of its armature. Latching relays and time delay relays of various types are known to those skilled in the art and may be employed instead of those shown here.

In this embodiment of the invention, both the latching relay 201 and the time delay relay 203 are arranged as double-pole, double-throw switches having single coils (not shown). Latching relay 201 operates in conjunction with time delay relay 203 to maintain power to the transmitter 83 for a sufficient time to energize the high powered halogen lamp 129 for signaling to the receiver 141 that a cart 13 has passed through the entrance and exit driveway 21. Preferably, the preset period of time in which latching relay 201 allows power to flow to the lamp 129, i.e., the time before time delay relay 203 resets latching relay 201, is adjustable depending on the particular application.

As arranged, the power supply (e.g., battery 71) connects to one side of the coil of, latching relay 201 via line 205 when at least one of the reed switches 59 closes in response to the magnet 41 mounted on a shopping cart 13 passing over it. The positive side of the power supply connects to a normally closed contact of time delay relay 203 via line 207 and then to the actuator 45 via line 209. The negative side of the power supply connects to the other normally closed contact of time delay relay 203 via line 211 and then to the other side of the coil of latching relay 201 via line 213. In this manner, the coil of latching relay 201 is positively biased with 12 V D.C. when continuity is present on line 209 and 205 due to at least one of the reed switches 59 closing.

In this embodiment, the positive side of the power supply connects to the two normally closed contacts of latching relay 201 via line 215. One of the two normally open contacts of latching relay 201 connects to the coil of time delay relay 203 via line 217. The coil also connects to the negative side of the power supply via line 219. As mentioned above, the other normally closed contact of time delay relay 203 connects to the negative side of the power supply via line 211. Therefore, energizing the coil of latching relay 201 applies positive power to one end of the coil of time delay relay 203 via lines 215 and 217. In this manner, time delay relay 203 switches positive power to latching relay 201 via lines 207 and 221 after a time delay corresponding to the preset period of time. Similarly, the other end of the coil of latching relay 201 connects to the negative side of the power supply via lines 211 and 223. Since reversing the polarity of the voltage applied to its coil resets latching relay 201, time delay relay 203 resets latching relay 201 each time a continuity is present on lines 205 and 209 when the magnet 41 passes over the magnetic actuator 45.

The circuit shown in FIG. 6 also energizes the solenoid 121 which is negatively biased by the power supply via line 225. Latching relay 201 switches the solenoid 121 by the contacts of one of its double throw switches (connections not shown). Therefore, the plunger 123 of the solenoid 121 depresses the shutter-release button 117 on the camera 113 when one of the reed switches 59 closes. Further, the power supply energizes the lamp 129 through latching relay 201 via line 227 to send its beam of light A to the photoelectric detector 165 of the receiver 141 thereby causing a warning issuance circuit W to activate an alarm. The warning issuance circuit W constitutes means for issuing a warning in response to receiving the transmitted signal A.

In operation, the security system 11 of the present invention is especially suited for a grocery or a retail store 17 having a quantity of shopping carts and a parking lot 15 accessible through entrance and exit driveways 21. Buried underneath the surfaces 19 of the entrance and exit driveways 21 and across their width are actuators 45 which are magnetically responsive to magnets. The remaining perimeter of the parking lot 15 has curbing or islands 29 for preventing the removal of shopping carts 13 from the parking lot 15. Alternatively, the actuator 45 may be provided around the whole perimeter of the parking lot 15. Each cart 13 has a magnet 41 mounted on the bottom of the frame 33 in a concealed fashion. The arrangement is such that upon passage of a cart 13 over the actuator 45, the magnet 41 triggers the actuator to generate a signal.

Adjacent the actuator 45 is a post 51 having a transmitter housing 75. The signal of the actuator 45 is received by a circuit board 77 housed within the transmitter housing 75. The circuit board is electrically connected to an alarm 85, a monitor 81 and a transmitter 83. In response to the signal via the circuit board 77, the alarm 85 mounted on the post 51 is activated. The alarm 85 is either an audible or visual alarm, or both. Also, the signal activates the monitor 81, which includes a photographic camera 131 for taking pictures of the person attempting to remove the shopping cart 13 from the parking lot 15. The monitor 81 may also include a video camera for filming the person. The signal also activates the transmitter 83 having a halogen lamp 129 which sends a beam of light A in a direction towards the store 17.

A receiver assembly 49, mounted on a post 53 on top of the store 17 and having a light sensitive receiver 141, receives the light beam A emitted from the transmitter 83. The receiver assembly 49 may issue a second warning alarm and send a signal to a console 185 capable of controlling and monitoring the operation of the system 11. The console 185 is preferably located in a security office 187 of the store 17. At that time, security personnel may investigate the removal of the shopping cart 13 from the parking lot 15 by monitors 189 displaying a video or even the photographs taken by the camera 113, or by physically going to the entrance and exit driveway 21.

The principles of the present invention have also been found useful for monitoring the unauthorized entry into a restricted area. Turning now to FIG. 7, there is shown a confined space or room 231 accessible only through an access passageway, i.e., door opening 233. A door 235, hingedly attached to a doorjamb 237a, is provided for blocking the entrance into or exit from the room 231 via the opening 233. As illustrated, the door 235 is in a closed position and includes a door knob 239 for releasing a door latch (not shown) to open the door 235. A lock or dead bolt 241 is provided to securely lock the door 235 in its closed position and is operated by a key.

The security system of this embodiment comprises embedding a magnet 243 (broadly "triggering means") in the door 235 adjacent the door knob 239. A sensor generally indicated at 245 comprising a magnetically responsive reed switch 247 is likewise embedded within the side of doorjamb 237b proximate to the magnet 243 when the door 235 is closed. The system of this embodiment is also operative by embedding the sensor 245 in the door 235 and the magnet 243 in the doorjamb 237b. Preferably, the reed switch 247 is magnetically responsive to close upon movement of the door 235, and consequently the magnet 243, away from the reed switch 247 for generating a signal. Thus, the sensor 245 is capable of generating a signal upon movement of the door 235 away from its closed position. Alternatively, this embodiment may be adapted to include a normally closed reed switch, which is open when the magnet 243 is proximate, and upon movement of the magnet away from the reed switch, the reeds of the switch close to generate the signal.

A monitor 249, comprising either a camera or a video camera, or both, is responsive to the signal from the sensor 245 for visually monitoring the entry into the room 231. The camera and the video camera are of the same construction as described in the aforementioned embodiment and are located proximate to the opening. Both are activated according to the principles of the first embodiment upon receiving the signal via wire 251.

The system is overridden, however, upon satisfying a security measure as proscribed by a keying device 253 electrically connected by wire 251 between the sensor 245 and the monitor 249. The keying device 253 may include many devices known in the art, such as an electronic pad activated upon satisfying a password, or upon passing a magnetically actuated key card through the key pad. Thus, authorized personnel, having the password or the key card, are able to enter the room 231 without activating the monitor 249 since the sensor 245 is overridden by the keying device 253. However, upon attempted entry by a person not knowing the password, or not having the key card, the monitor 249 is activated to visually monitor the unauthorized person.

In view of the above, it will be seen that the several objects of the invention are achieved and other advantageous results attained.

As various changes could be made in the above constructions without departing from the scope of the invention, it is intended that all matter contained in the above description as shown ill the accompanying drawing shall be interpreted as illustrative and not in a limiting sense.

What is claimed is:

1. A system for preventing theft of a shopping cart from a parking lot of an establishment where the carts are used, the lot having at least one entrance and exit driveway, the system comprising:

triggering means mounted on the shopping cart;

sensor means substantially buried below the surface of the driveway for generating a signal in response to passage of the cart with said triggering means over the sensor means, said sensor means extending generally transversely with respect to and substantially completely across the driveway; and means for issuing a warning in response to the signal generated by said sensor means.

2. A system as set forth in claim 1 wherein said triggering means comprises a magnet and said sensor means comprises an elongate, magnetically responsive, actuator means activated upon passage of a cart having a magnet at any point along the width of the driveway.

3. A system as set forth in claim 2 wherein the magnetically responsive actuator means comprises a protective outer shell member and a plurality of elongate reed switches arranged in end to end relation within the shell member, said reed switches being electrically connected in parallel such that said strip generates the signal upon passage of a cart having a magnet over any one of the reed switches.

4. A system as set forth in claim 3 wherein the actuator means is buried below the surface of the driveway generally parallel to the surface.

5. A system as set forth in claim 4 further comprising means responsive to the signal from said sensor means for photographing the cart after it passes over said sensor means, said photographing means being located proximate to the entrance and exit driveway.

6. A system as set forth in claim 5 wherein said photographing means comprises a camera having an operating button and means responsive to the signal generated by said sensor means for depressing the button.

7. A system as set forth in claim 4 further comprising means responsive to the signal from said sensor means for monitoring the movement of a cart after it passes over said sensor means said monitoring means being located proximate to the entrance and exit driveway.

8. A system as set forth in claim 7 wherein said monitoring means comprises a video camera and means for activating the video camera in response to the signal from the sensor means and for deactivating the video camera after a predetermined period of time.

9. A system as set forth in claim 4 further comprising means at the entrance and exit driveway for transmitting the signal generated by said sensor means above the surface and means for receiving the transmitted signal and issuing the warning in response thereto at a remote location from the entrance and exit driveway.

10. A system as set forth in claim 9 further comprising means for latching the signal generated by said sensor means to provide sufficient time for generating the power necessary to operate said transmitting means.

11. A system as set forth in claim 10 further comprising means for resetting the latching means after a preset period of time.

12. A system as set forth in claim 11 wherein said latching means is responsive to an applied voltage for setting said latching means and said resetting means comprises means for reversing the polarity of voltage applied to the latching means thereby resetting the latching means.

13. A system as set forth in claim 10 wherein said transmitting means comprises a light source electrically connected to said sensor means and being capable of generating a beam of light and wherein said means for receiving the transmitted signal includes light sensitive receiving means, spaced away from the light source, for receiving the beam.

14. A system as set forth in claim 13 wherein the light source is a quartz halogen lamp and said receiving means comprises a photoelectric detector and an adjustable iris for detecting and receiving the beam generated by the quartz halogen lamp.

15. A system for preventing theft of a device from a substantially confined area, the area having at least one entrance and exit passageway, the system comprising:

triggering means mounted on the device;

passageway substantially buried below the surface of the sensor means for generating a signal in response to passage of the device with the triggering means over the sensor means, said sensor means extending generally transversely with respect to and substantially completely across the passageway;

means for issuing a warning in response to the signal generated by said sensor means;

wherein said triggering means comprises a magnet and said sensor means comprises an elongate, magnetically responsive, actuator means activated upon passage of a device having a magnet at any point along the width of the passageway;

wherein the magnetically responsive actuator means comprises a protective outer shell member and a plurality of elongate reed switches arranged in an end to end relation within the shell member, said reed switches being electrically connected in parallel such that said strip generates the signal upon passage of a device having a magnet over any one of the reed switches;

wherein the actuator means is buried below the surface of the passageway generally parallel to the surface;

means at the entrance and exit passageway for transmitting the signal generated by said sensor means above the surface and means for receiving the transmitted signal and issuing the warning in response thereto at a remote location from the entrance and exit passageway; and means for latching the signal generated by said sensor means to provide sufficient time for generating the power necessary to operate said transmitting means.

16. A system as set forth in claim 15 further comprising means for resetting the latching means after a preset period of time.

17. A system as set forth in claim 16 wherein said latching means is responsive to an applied voltage for setting the latching means and said resetting means comprises means for reversing the polarity of voltage applied to the latching means thereby resetting the latching means.

18. A system as set forth in claim 15 wherein said transmitting means comprises a light source electrically connected to said sensor means and being capable of generating a beam of light and wherein said means for receiving the transmitted signal includes light sensitive receiving means, spaced away from the light source, for receiving the beam.

19. A system as set forth in claim 18 wherein the light source is a quartz halogen lamp and said light sensitive receiving means comprises a photoelectric detector and an adjustable iris for detecting and receiving the beam generated by the quartz halogen lamp.

* * * * *